(12) United States Patent
Oosterhuis et al.

(10) Patent No.: US 7,239,776 B2
(45) Date of Patent: Jul. 3, 2007

(54) FIBER OPTIC ROTARY JOINT AND ASSOCIATED ALIGNMENT METHOD

(75) Inventors: Martin J. Oosterhuis, Blacksburg, VA (US); Jerry T. Perdue, Christiansburg, VA (US); Carlton W. Sutphin, Christiansburg, VA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 11/392,283

(22) Filed: Mar. 29, 2006

(65) Prior Publication Data

US 2006/0257077 A1 Nov. 16, 2006

(51) Int. Cl.
*G02B 6/26* (2006.01)

(52) U.S. Cl. .............. 385/25; 385/26; 385/36; 385/39; 385/88; 385/89

(58) Field of Classification Search .......... 385/88–93, 385/69, 33–36, 25–27
See application file for complete search history.

(56) References Cited

U.S. PATENT DOCUMENTS

| | | | |
|---|---|---|---|
| 4,682,848 A * | 7/1987 | Cairns et al. ............... | 385/69 |
| 5,039,193 A * | 8/1991 | Snow et al. ................ | 385/25 |
| 5,271,076 A | 12/1993 | Ames | |
| 5,394,493 A | 2/1995 | Ames | |
| 5,400,429 A | 3/1995 | Ames et al. | |
| 5,442,721 A * | 8/1995 | Ames ........................ | 385/26 |
| 6,301,405 B1 | 10/2001 | Keil | |
| 7,031,567 B2 * | 4/2006 | Grinderslev et al. ......... | 385/34 |
| 2003/0210874 A1 * | 11/2003 | Souda et al. ................ | 385/89 |

\* cited by examiner

*Primary Examiner*—Brian Healy
*Assistant Examiner*—Guy G Anderson
(74) *Attorney, Agent, or Firm*—Phillips Lytle LLP (57) ABSTRACT

A fiber optic rotary joint is provided that is unaffected by variations in the optical properties of a fluid that fills its internal cavity. The rotary joint includes a housing defining the internal cavity, first and second optical collimation arrays on opposite sides of the internal cavity, and a reversion prism between the optical collimation arrays. Further, the rotary joint includes an interface optical element proximate at least one of the first and second optical collimation arrays and the reversion prism. Each interface optical element includes an optically-flat surface adapted to contact the fluid such that optical signals that are oriented normal to the optically-flat surface can be transmitted without refraction, thereby rendering the optical signals immune to variations in the fluid's optical properties. A reversion prism assembly, an optical collimation assembly and a method of aligning an optical collimation array utilizing alignment pins are also provided.

9 Claims, 3 Drawing Sheets

FIBER OPTIC ROTARY JOINT AND ASSOCIATED ALIGNMENT METHOD

FEDERALLY SPONSORED RESEARCH OR DEVELOPMENT

The research underlying this invention was supported at least in part with funds from U.S. Navy Contract No. N00024-00-C-4059. The United States Government may therefore have an interest in the subject matter of this invention.

CROSS-REFERENCE TO RELATED APPLICATIONS

This application claims the benefit of U.S. Provisional Application Ser. No. 60/494,445, filed Aug. 12, 2003, the contents of which are incorporated herein in their entirety.

FIELD OF THE INVENTION

The present invention relates generally to fiber optic rotary joints and associated alignment methods and, more particularly, to reversion prism assemblies, optical collimation assemblies and associated fiber optic rotary joints that include an interface optical element that is exposed to the fluid within the fiber optic rotary joint and that is designed to reduce, if not eliminate, the deleterious effects otherwise caused by changes in the index of refraction of the fluid.

BACKGROUND OF THE INVENTION

In a number of applications, it is desirable to interconnect two bundles of optical fibers, each of which includes a plurality of optical fibers. Moreover, it is frequently desirable that at least one of the bundles of fibers be permitted to rotate, such as about the longitudinal axis of the bundle, relative to the other bundle of optical fibers. As such, fiber optic rotary joints are employed to appropriately interconnect respective optical fibers of two different bundles, while permitting at least one of the bundles to rotate relative to the other. See, for example, U.S. Pat. No. 6,301,405 to Mitchel J. Keil, U.S. Pat. No. 5,442,721 to Gregory H. Ames and U.S. Pat. No. 5,271,076 to Gregory H. Ames, the contents of each of which are incorporated herein in their entirety.

A fiber optic rotary joint includes a housing that defines an internal cavity. The housing is adapted to engage end portions of two bundles of optical fibers, hereinafter referenced as the first and second bundles. As such, the first and second bundles of optical fibers are typically disposed on opposite sides of the internal cavity. By appropriately aligning the first and second bundles of optical fibers, respective pairs of the optical fibers of the first and second bundles can communicate across the internal cavity. In order to assist with this alignment and to facilitate communications between the first and second bundles of optical fibers, the fiber optic rotary joint includes a reversion prism. A reversion prism is a trapezoidal prism defining a longitudinal axis therethrough and having opposed end faces that are disposed at equal, but opposite, angles relative to the longitudinal axis. As such, optical signals emitted by an optical fiber of the first bundle are refracted by one angled end surface of the reversion prism, totally reflected from the longer base surface of the reversion prism, and then refracted again upon exiting from the other angled end surface of the reversion prism. If aligned properly, the optical signals exiting the reversion prism are received by a respective optical fiber of the second bundle. In order to facilitate this alignment and optical coupling of respective fibers of the first and second bundles, the reversion prism may be mounted upon a stage that permits the reversion prism to be controllably positioned. See, for example, U.S. Pat. No. 6,301,405.

The first and second bundles of optical fibers generally terminate with a respective optical collimation array. A conventional optical collimation array includes an outer sleeve or bearing that defines a lengthwise extending passage in which the end portions of the optical fibers are disposed. A collimating lens, such as a ball lens, may be associated with each optical fiber such that the signals emitted by the respective optical fiber are collimated by the ball lens before being launched through the internal cavity. At least one, if not both, of the optical collimation arrays is adapted to rotate about a longitudinal axis defined by the outer sleeve relative to the housing.

By appropriately aligning the optical collimation arrays and the reversion prism, however, the fiber optic rotary joint may maintain alignment of respective optical fibers of the first and second bundles as at least one of the first and second bundles rotates. In this regard, a fiber optic rotary joint is designed to rotate the housing at a rate that is 50% of the rate at which the bundle of optical fibers rotates. By rotating the housing at this rate, the reversion prism maintains optical alignment between respective optical fibers of the first and second bundles.

Fiber optic rotary joints are commonly utilized in sub-sea applications so as to couple first and second bundles of optical fibers in a manner that permits at least one of the bundles to rotate relative to the other. For example, fiber optic rotary joints may be utilized to optically couple the bundles of optical fibers that are utilized to communicate with underwater vehicles that may go to depths of 5,000 meters. In order to permit the fiber optic rotary joint to withstand the substantial compressive pressure experienced in a number of sub-sea applications in which the fiber optic rotary joint is at a substantial depth below sea level, the internal cavity defined by the housing of the fiber optic rotary joint is filled with an inert fluid, such as a halogenated hydrocarbon oil. Unfortunately, the optical properties of the fluid that fills the internal cavity of a fiber optic rotary joint vary significantly with changes in temperature and/or pressure due to corresponding changes in the density of the fluid. In particular, the index of refraction of the fluid varies as the temperature and/or pressure changes. As will be recognized, variations in the index of refraction of the fluid filling the internal cavity can significantly alter the angle at which the optical signals refract upon entering and exiting the reversion prism. Additionally, variations in the index of refraction of the fluid that fills the internal cavity of a fiber optic rotary joint alters the effective focal distance of the collimation lens. As such, the optical alignment between the first and second bundles of optical fibers is therefore diminished as the index of refraction of the fluid filling the internal cavity varies with changes in temperature and/or pressure, such as those experienced in a sub-sea environment. Accordingly, optical signals will not be coupled as efficiently, if at all, between the first and second bundles of optical fibers, thereby adversely affecting the optical performance of the fiber optic rotary joint.

As such, it would be desirable to provide an improved fiber optic rotary joint that further facilitates the alignment of first and second bundles of optical fibers, at least one of which is adapted to rotate relative to the other. In particular, it would be desirable to provide an improved fiber optic rotary joint that is capable of operating in a sub-sea environment in which the internal cavity has been filled with a fluid whose optical properties, including its index of refraction, may vary with changes in temperature and/or pressure. In particular, it would be desirable to provide a fiber optic rotary joint that maintains the alignment of the first and second bundles of optical fibers even as the optical properties of the fluid that fills the internal cavity vary.

In addition to the difficulties imparted by changes in the optical properties of the fluid, the optical fibers and the various optical components must also be properly aligned initially in order to avoid other sources of optical misalignment. In this regard, even a slight misalignment of the optical fibers will increase the insertion loss and, in some instances, render the fiber optic rotary joint unacceptable for at least some applications.

In order to properly align the first and second bundles of optical fibers, it is desirable that the optical fibers extend lengthwise through the respective outer sleeve with the longitudinal axes of the optical fibers being parallel to the longitudinal axis defined by the outer sleeve. As such, the outer sleeve is desirably sized such that the optical fibers are snugly received and held therewithin. This snug receipt of the optical fibers requires that the outer sleeve define an inner diameter very precisely with little tolerance. Such outer sleeves or bearings are therefore rarely, if ever, an off-the-shelf part and must be specifically manufactured to exacting tolerances, thereby increasing the overall cost of the fiber optic rotary joint. Even in instances in which the optical fibers are snugly received within the outer sleeve, the optical fibers may not necessarily be parallel to the longitudinal axis of the outer sleeve. In a common embodiment in which the bundle of optical fibers includes seven optical fibers arranged so as to have a central optical fiber and six optical fibers spaced thereabout, the six peripheral optical fibers may be twisted in a common direction, such as in a relatively helical pattern, about the central optical fiber. As such, the optical signals emitted by the bundle of optical fibers that are somewhat twisted may not be properly aligned with respective optical fibers of the other bundle of optical fibers, thereby reducing the efficiency with which optical signals are transmitted therebetween. Accordingly, each optical fiber and its respective collimation lens must generally be individually positioned so as to appropriately align the optic fiber and the associated collimating lens with the longitudinal axis defined by the sleeve. As will be recognized, this individual alignment can be quite time consuming. Once the optical fibers have been aligned, the optical fibers may be held in position by an epoxy. Unfortunately, the epoxy may cause the optical fibers to become slightly misaligned as the epoxy cures, thereby again disadvantageously increasing the insertion loss.

BRIEF SUMMARY OF THE INVENTION

An improved fiber optic rotary joint and its attendant components are therefore provided that can maintain the alignment of first and second bundles of optical fibers as the optical properties of a fluid that fills the internal cavity of the fiber optic rotary joint vary. As such, the fiber optic rotary joint can be utilized in sub-sea applications in which the temperature and/or pressure to which the fiber optic rotary joint is exposed fluctuates which causes the density and, in turn, the optical properties of the fluid that fills the internal cavity of the fiber optic rotary joint to vary. According to another aspect of the present invention, a method of aligning an optical collimation array is provided that facilitates the orientation of the optical fibers to be parallel to the longitudinal axis of the outer sleeve in which the optical fibers are disposed. In this aspect of the invention, the method permits the orientation of the optical fibers to be readily adjusted and then affixed in position such that the optical fibers maintain the desired orientation during subsequent usage.

According to one aspect of the present invention, a fiber optic rotary joint is provided that includes a housing defining an internal cavity adapted to be at least partially filled with a fluid. The fiber optic rotary joint also includes first and second optical collimation arrays disposed on opposite sides of the internal cavity for transmitting optical signals therethrough, and a reversion prism disposed within the internal cavity between the first and second optical collimation arrays. Further, the fiber optic rotary joint includes an interface optical element proximate at least one of the first and second optical collimation arrays and the reversion prism. In one embodiment, for example, the fiber optic rotary joint includes a plurality of interface optical elements that are proximate each of the first and second optical collimation arrays and the reversion prism.

Each interface optical element includes an optically-flat surface adapted to contact the fluid that fills the internal cavity. The interface optical element is also adapted to permit optical signals that are oriented normal to the optically-flat surface to be transmitted between the fluid and the interface optical element. Since the optical signals enter and exit the interface optical element in a direction that is normal to the optically-flat surface of the interface optical element, the optical signals are not refracted and, as such, variations in the optical properties, including the index of refraction, of the fluid that fills the internal cavity of the fiber optic rotary joint do not affect the propagation of the optical signals. As such, the alignment of the first and second bundles of optical fibers is thereby maintained by the fiber optic rotary joint of the present invention as the optical properties of the fluid vary, such as in response to changes in the temperature and/or pressure to which the fiber optic rotary joint is exposed.

In one aspect of the present invention, a reversion prism assembly is provided that may be disposed within the internal cavity of the fiber optic rotary joint housing. The reversion prism assembly consists of the combination of the reversion prism and an interface optical element disposed proximate the reversion prism. In this regard, the reversion prism extends longitudinally between opposed end surfaces and defines a longitudinal axis extending through the opposed end surfaces. Additionally, the opposed end surfaces are disposed at a nonorthogonal angle relative to the longitudinal axis. As such, the reversion prism may be a trapezoidal prism.

In this aspect of the present invention, one interface optical element is disposed proximate a respective end surface of the reversion prism. The interface optical element is positioned such that the optically-flat surface is orthogonal to the longitudinal axis. Thus, the optical signals that enter and exit the reversion prism assembly are advantageously normal to the optically-flat surface of the interface optical element, thereby permitting the optical properties, including the index of refraction, of the fluid to vary without adversely affecting the propagation of the optical signals therethrough. Typically, the reversion prism assembly also includes a second interface optical element disposed proximate the opposite end surface of the reversion prism such that the optical signals entering and exiting the reversion prism assembly from either end are immune to variations in the optical properties of the fluid. While the reversion prism and the interface optical element(s) may be formed of various materials, the reversion prism generally has an index of refraction that is greater than the index of refraction of the interface optical element.

The interface optical element generally includes a mating surface that faces the respective end surface of the reversion prism. This mating surface is also advantageously disposed at the same nonorthogonal angle relative to the longitudinal axis as the respective end surface of the reversion prism. As such, the interface optical element may be a triangular prism which is designed such that the mating surface of the triangular prism is adhered to the respective end surface of the trapezoidal prism, while maintaining the optically-flat surface of the triangular prism in an orthogonal direction relative to the longitudinal axis.

According to another aspect of the present invention, the interface optical element may be disposed proximate an optical collimation array to form a plurality of optical collimation assemblies. According to this embodiment, each optical collimation assembly may include an optical fiber and a collimating lens disposed in optical communication with the optical fiber. The collimating lens collimates the light transmitted and/or received by the optical fiber relative to a collimation optical axis defined by the collimating lens. Each optical collimation assembly of this embodiment also includes an interface optical element, such as a plane-parallel plate, disposed proximate the collimating lens. The interface optical element is oriented such that the optically-flat surface is orthogonal to the collimation optical axis.

The optical collimation assembly may also include a sleeve in which the collimating lens and the interface optical element are disposed. The sleeve generally opens into a housing that is at least partially filled with the fluid such that the interface optical element is exposed to the fluid. Since the optically-flat surface of the interface optical element is orthogonal to the collimation optical axis, however, the optical signals enter and exit the interface optical element at an orientation that is normal to the optically-flat surface such that variations in the optical properties, including the index of refraction, of the fluid do not adversely affect the propagation of the optical signals therethrough. The optical collimation assembly may further include one or more index matching elements disposed within the sleeve, such as between an end portion of the optical fiber and the collimating lens and/or between the collimating lens and the interface optical element. The index matching elements prevent the fluid from residing in the optical path within the optical collimation assembly, such that variations in optical properties, including index of refraction, of the fluid do not adversely affect the effective focal length for the collimating lens. Additionally, the index matching elements are included so as to reduce undesirable back reflections within the optical collimation assembly.

According to another aspect of the present invention, an improved method of aligning an optical collimation array is provided. The optical collimation array includes a plurality of collimation assemblies with each collimation assembly including a sleeve, a collimating lens disposed within the sleeve and an optical fiber having an end portion disposed within the sleeve. According to this aspect of the present invention, at least one elongate alignment pin is inserted into the optical collimation array. The elongate alignment pin is inserted such that it extends lengthwise along a respective collimation assembly. In those embodiments in which the optical collimation array also includes an outer sleeve surrounding the plurality of collimation assemblies, the alignment pin is advantageously inserted both proximate the outer sleeve and alongside a respective collimation assembly.

Typically, a plurality of elongate alignment pins are inserted into the optical collimation array such that at least one elongate alignment pin extends lengthwise along each respective collimation assembly. The at least one alignment pin is then adjusted to alter an angle between the respective alignment pin and the physical axis of the optical collimation array, such as defined by the outer sleeve. In this regard, the alignment pin is generally adjusted to be parallel with the physical axis of the optical collimation array. In the embodiment that includes a plurality of alignment pins, a pair of alignment pins that are spaced apart from one another, such as on opposite sides of the optical collimation array, may be twisted until the alignment pins are parallel with the physical axis of the optical collimation array.

Once properly adjusted, the plurality of collimation assemblies are affixed in position. In this regard, the alignment pin may be removed following its adjustment and at least one affixation pin may be inserted into the optical collimation array in place of the alignment pin. Each affixation pin is larger than the respective alignment pin and is sized to affix the plurality of collimation assemblies in position.

According to this aspect of the present invention, an optical collimation array including a plurality of optical fibers may be efficiently aligned such that each collimation assembly including each optical fiber is positioned to be parallel to the physical axis of the optical collimation array. As such, optical signals transmitted and received by the optical collimation array can be more reliably and maintainably aligned with another optical collimation array, such as within a fiber optic rotary joint or the like.

Accordingly, an improved fiber optic rotary joint is provided according to one embodiment of the present invention that maintains the alignment of first and second bundles of optical fibers as the optical properties, including the index of refraction, of the fluid that fills the fiber optic rotary joint varies in response to temperature and/or pressure changes. In this regard, a reversion prism assembly and/or an optical collimation assembly may be provided in which interface optical element(s) are disposed proximate the reversion prism and the collimating lens, respectively, in order to provide an optically-flat surface through which signals enter and exit with an orthogonal orientation so as not to be refracted by the fluid disposed within the internal cavity of a fiber optic rotary joint. According to another aspect of the present invention, an improved method of aligning an optical collimation array such that the plurality of collimation assemblies including the plurality of optical fibers are commonly oriented to be parallel to the physical axis of the optical collimation array, thereby also improving the alignment of the bundles of optical fibers optically interconnected by a fiber optic rotary joint.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
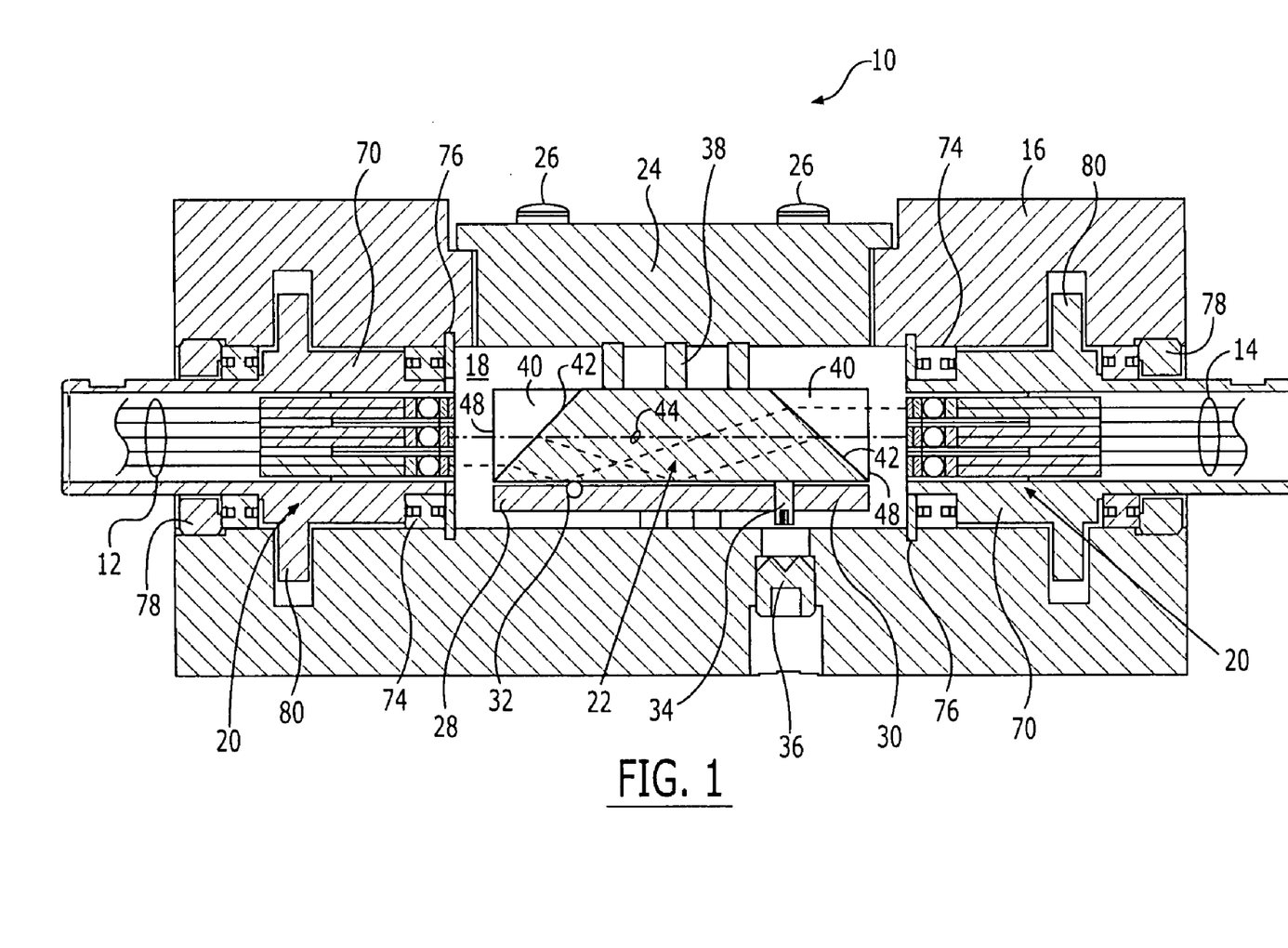
FIG. 1 is a fiber optic rotary joint according to one aspect of the present invention.

As shown in FIG. 1, a fiber optic rotary joint 10 according to one aspect of the present invention is depicted. The fiber optic rotary joint may be employed in a variety of applications, including sub-sea as well as other applications. As described below, the fiber optic rotary joint is designed to optically interconnect first and second bundles 12,14 of optical fibers while permitting at least one of the bundles to rotate relative to the other bundle. While one bundle is generally held stationary and the other bundle is generally permitted to rotate about its longitudinal axis, both bundles of optical fibers may rotate about their respective longitudinal axes, if desired.

The fiber optic rotary joint 10 includes a housing 16. The housing is generally cylindrical, although the housing may have other shapes if desired. As shown, the housing defines the internal cavity 18. In sub-sea applications in which the fiber optic rotary joint will be exposed to substantial compressive pressures, the internal cavity may be filled with an inert fluid, such as a halogenated hydrocarbon oil. The fluid filling the internal cavity therefore protects the housing and the components disposed within the housing from damage due to the substantial compressive pressures. In other applications, such as land-based applications, the internal cavity of the housing need not be filled with fluid, but may, instead, be filled with air or the like.

The fiber optic rotary joint 10 also includes first and second optical collimation arrays 20. The first and second optical collimation arrays are disposed in respective passages defined by the housing 16 that open into the internal cavity 18. As shown, the first and second optical collimation arrays are generally positioned on opposite sides of the internal cavity for transmitting optical signals therethrough. While the optical collimation arrays may each have only a single element in which case the fiber optic rotary joint would be a single channel fiber optic rotary joint, the optical collimation arrays typically include a plurality of elements such that the fiber optic rotary joint is a multi-channel fiber optic rotary joint. As such, a fiber optic rotary joint will be subsequently described in conjunction with first and second optical collimation arrays that have multiple elements for purposes of example, but not of limitation.

One or both of the optical collimation arrays 20 may be rotatably mounted to the housing 16 such that one optical collimation array may rotate about its respective longitudinal axis relative to the other optical collimation array. In the embodiment illustrated in FIG. 1, for example, both optical collimation arrays are rotatably mounted within the housing. However, even in this embodiment, one of the optical collimation arrays may be fixed, such as by engaging the portion of the optical collimation array that extends external to the housing so as to prevent the respective optical collimation array from rotating, if desired.

The fiber optic rotary joint 10 also includes a reversion prism 22 disposed within the internal cavity 18 between the first and the second optical collimation arrays 20. The optical signals transmitted between the optical collimation arrays therefore pass through the reversion prism, which maintains the alignment between respective optical fibers of the first and second optical collimation arrays as at least one of the optical collimation arrays rotates about its longitudinal axis relative to the other. As known to those skilled in the art, the housing 16 and, in particular, the reversion prism, may also be rotated at a rate that is 50% of the rate at which the optical collimation assembly rotates. By rotating the housing and, in particular, the reversion prism in this manner, the fiber optic rotary joint maintains optical communication between the same respective pairs of optical fibers of the first and second optical collimation arrays even as the optical collimation array rotates.

As shown in FIG. 1, the housing 16 may include a removable cover 24 that may be secured to the remainder of the housing by bolts 26 or other connectors. By removing the cover, access to the internal cavity 18 and the reversion prism 22 is provided. To facilitate precise positioning of the reversion prism, the reversion prism may be mounted upon a stage 28, such as that described in detail by U.S. Pat. No. 6,301,405. The stage facilitates the positioning of the reversion prism in at least three directions. In this regard, the base portion 30 of the stage may define a groove for receiving a corresponding pin 32 that extends upwardly beyond the surface of the base portion such that the reversion prism at least partially rests upon the pin. Additionally, a set screw 34 can extend through the base portion. As such, by advancing or retracting the set screw, the position of the reversion prism may be adjusted, such as to pivot on the pin 32 as depicted in the embodiment of FIG. 1. In order to permit access to the set screw, the housing can define an opening aligned with the set screw. Once the reversion prism has been properly positioned, however, a plug 36 may be disposed within the opening such that fluid may be retained within the internal cavity. Additionally, at least one of the side walls (not shown) of the stage may also define a groove and receive a corresponding pin that protrudes outwardly beyond the respective side wall for contacting a side surface of the reversion prism. Another set screw can extend through the respective side wall such that the position of the reversion prism can be adjusted in another direction, such as to pivot on the pin into and out of the page in the embodiment depicted in FIG. 1, by advancing or retracting the set screw. Again, the housing may define an opening aligned with the set screw to provide access to the set screw and, once the reversion prism is properly positioned, a plug may be disposed within the respective opening. Additionally, a guidepost integrally attached to the base portion of the stage 28 is supported on the end of a set screw (not shown). As such, by advancing or retracting the set screw, the position of the stage, and as a result the reversion prism, may be adjusted, such as in a vertical direction as depicted in the embodiment of FIG. 1.

One or more springs 38, such as one or more helical springs, may also be disposed between the cover 24 and the reversion prism 22. Likewise, one or more springs (not shown), such as a leaf spring, may be disposed between a respective side wall 28 of the stage and the reversion prism. These springs serve to bias the reversion prism into contact with the stage and the various alignment elements carried by the stage and reduce, if not eliminate, subsequent movement of the reversion prism once the reversion prism has been appropriately aligned. As shown in FIG. 1, the first and second optical collimation arrays 20 and the reversion prism would all be exposed to and in contact with any fluid that fills the internal cavity 18 defined by the housing 16. In the absence of the present invention, therefore, variations in the temperature and/or pressure to which the fiber optic rotary joint 10 is exposed would cause the density and, in turn, the optical properties, such as the index of refraction, of the fluid to vary which would disadvantageously alter the manner in which the optical signals are refracted upon entry into and exit from the first and second collimation arrays and the reversion prism, thereby reducing the alignment between respective optical fibers of the first and second optical collimation arrays.

According to the present invention, the fiber optic rotary joint 10 also includes one or more interface optical elements. As described in detail below, the interface optical elements may be disposed proximate to one or both of the first and second optical collimation arrays 20 and/or proximate the reversion prism 22. The interface optical element includes an optically-flat surface 48 that is adapted to contact the fluid. As known to those skilled in the art, an optically-flat surface introduces optical distortions that are small relative to the wavelength of the optical signals. Thus, optical signals may be transmitted between the interface optical element and the fluid that fills the internal cavity 18 of the housing 16 in an orientation that is normal to the optically-flat surface without causing the optical signals to refract. As such, variations in the optical properties of the fluid, such as variations in the index of refraction of the fluid, will not alter the manner in which the optical signals propagate and, as such, will not disadvantageously alter the alignment of the respective optical fibers of the first and second optical collimation arrays.

In one aspect of the invention, a reversion prism assembly is provided that not only includes the reversion prism 22, but also at least one interface optical element 40 disposed proximate thereto. As shown in FIG. 1 and in somewhat more detail in FIG. 2, the reversion prism assembly includes a reversion prism extending longitudinally between opposed end surfaces 42, 42 and defining a longitudinal axis 44 that extends through the opposed end surfaces. The opposed end surfaces are disposed at a non-orthogonal angle relative to the longitudinal axis. In this regard, the opposed end surfaces generally define an equal, but opposite angle, such as 45.degree., relative to the longitudinal axis. As such, the reversion prism is typically a trapezoidal prism. While the reversion prism may be formed of various materials, the reversion prism of one embodiment is formed of a glass having a relatively high index of refraction, such as LASFN9 glass having an index of refraction of about 1.85.

Figure 2:
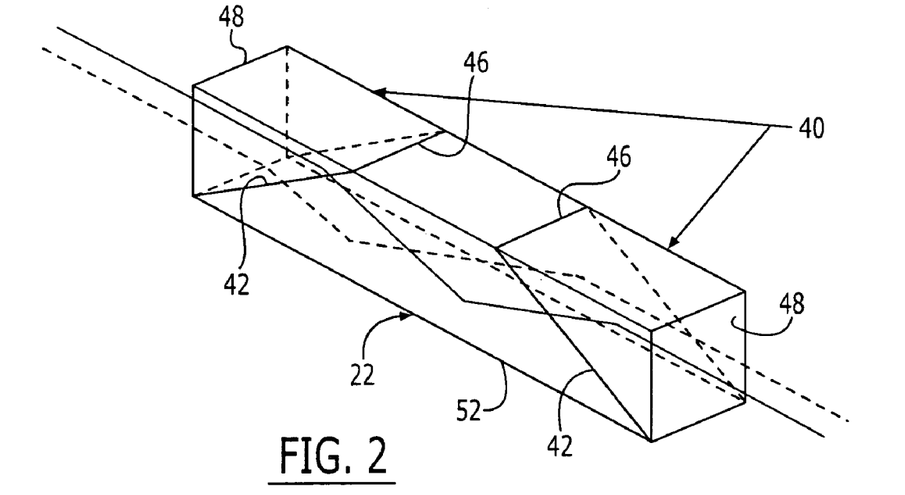
FIG. 2 is a perspective view of a reversion prism assembly according to another aspect of the present invention.

The reversion prism assembly of this aspect of the present invention also includes at least one interface optical element 40 disposed proximate a respective end surface 42 of the reversion prism 22. In this regard, the interface optical element generally includes a mating surface 46 that is attached to the respective end surface of the reversion prism, such as by means of an optically-transparent epoxy. In this regard, the mating surface is generally disposed at the same non-orthogonal angle to the longitudinal axis 44 as the respective end surface of the reversion prism. In addition to the mating surface, the interface optical element includes the optically-flat surface 48 through which optical signals enter and exit the reversion prism assembly. According to this aspect of the present invention, the optically-flat surface is disposed orthogonally to the longitudinal axis defined by the reversion prism. Thus, the interface optical element may be a triangular prism that is adhered to the respective end surface of the trapezoidal reversion prism. The interface optical element of this embodiment may be formed of various materials, but generally is formed of a glass having an index of refraction that is somewhat lower than that of the reversion prism. For example, the interface optical element may be formed of BK7 glass having an index of refraction of about 1.5. By increasing the difference between the indices of refraction of the reversion prism and the interface optical element, the size, i.e., the length as measured along the longitudinal axis, of the reversion prism assembly is reduced, which advantageously facilitates the incorporation of the reversion prism assembly in a smaller housing.

By providing an optically-flat surface 48 through which optical signals propagate in an orthogonal, i.e., normal, orientation, changes in the index of refraction of the fluid, such as those created by variations in the temperature and/or pressure to which the fiber optic rotary joint is exposed, do not affect the propagation of the optical signals since the optical signals are not refracted at the interface of the optically-flat surface of the interface optical element 40 and the fluid. Thus, the optical alignment of respective optical fibers of the first and second optical collimation arrays 20 is maintained. In order to facilitate the propagation of optical signals through the optically-flat surface of the interface optical element, the optically-flat surface may be coated with an anti-reflection coating, if desired.

As shown in FIGS. 1 and 2, the reversion prism assembly may include a second interface optical element 40 disposed proximate to the other end surface 42 of the reversion prism 22. In this regard, the second interface element may also have a mating surface 46 that is adhered to the other end surface of the reversion prism. As before, the mating surface of the second interface optical element is also advantageously disposed at the same non-orthogonal angle relative to the longitudinal axis 44 as the respective end surface of the reversion prism. As such, the optically-flat surface 48 of the second interface optical element is disposed orthogonal to the longitudinal axis of the reversion prism in order to facilitate the propagation of optical signals therethrough in a direction normal to the optically-flat surface. The optically-flat surface of the second interface optical element may also be coated with an anti-reflection coating, if desired.

As such, optical signals may propagate through a reversion prism assembly of one embodiment of the present invention as depicted in FIG. 2. As shown, optical signals enter through the optically-flat surface 48 of one of the interface optical elements 40. Since the optical signals enter in a direction that is normal to the optically-flat surface, the optical signals are advantageously not refracted at the interface between the surrounding fluid and the interface optical element. The optical signals are refracted, however, by the interface between the interface optical element and the reversion prism 22 due to the difference in the respective indices of refraction. The optical signals reflect from the base portion 52 of the reversion prism. In order to facilitate the reflection from the base portion of the reversion prism, the base portion may have a reflection coating. After the reflection from the base portion, the optical signals are again refracted by the interface between the other end surface of the reversion prism and the other interface optical element so as to again be directed normal to the optically-flat surface of the other interface optical element. Thus, changes in the index of refraction of the fluid that fills the internal cavity of the fiber optic rotary joint do not alter the propagation of the optical signals such that the optical signals can continue to be coupled between respective optical fibers of the first and second optical collimation arrays.

According to another aspect of the present invention, an optical collimation assembly 54 is provided in instances in which the interface optical element 56 is disposed proximate one or both of the optical collimation arrays 20, either instead of or, most typically, in addition to being disposed proximate the reversion prism 22. As shown in FIG. 1 and in somewhat more detail in FIG. 3, the optical collimation assembly includes an optical fiber 55 and a collimating lens 58 disposed in optical communication with the optical fiber. Thus, the optical signals emitted or received by the optical fiber are collimated by the collimating lens along a predefined collimation optical axis 60. An end portion of the optical fiber is commonly disposed within a ferrule 62, such as a ceramic ferrule of the type utilized by conventional fiber optic connectors. In addition, while various types of collimating lenses may be utilized, a ball lens serves to collimate the optical signals in one embodiment. In addition, while the collimating lens may be formed of various materials, the collimating lens is formed of LASFN9 glass having an index of refraction of about 1.85 in one embodiment. The optical collimation assembly may also include a sleeve 64 in which the collimating lens as well as the end portion of the optical fiber are disposed. In this regard, the sleeve may be sized such that the inner diameter of the sleeve is approximately equal to the diameter of the collimating lens and the ferrule in which the end portion of the optical fiber may be disposed, such as 2.5 mm in one embodiment, such that the collimating lens and the ferrule are snugly received therewithin. Alternatively, the sleeve may be sized to define an inner diameter that is slightly smaller than the components to be disposed therein. However, the sleeve of this embodiment may define a lengthwise extending slit to permit the sleeve to open further to accept the components and to hold the components snugly therein. The sleeve may be formed of various materials, but is formed of a ceramic material in one embodiment. By snugly receiving and holding the collimating lens and the ferrule, the sleeve advantageously maintains optical alignment of the optical fiber and the collimating lens as is desired maintaining a relatively low insertion loss.

Figure 3:
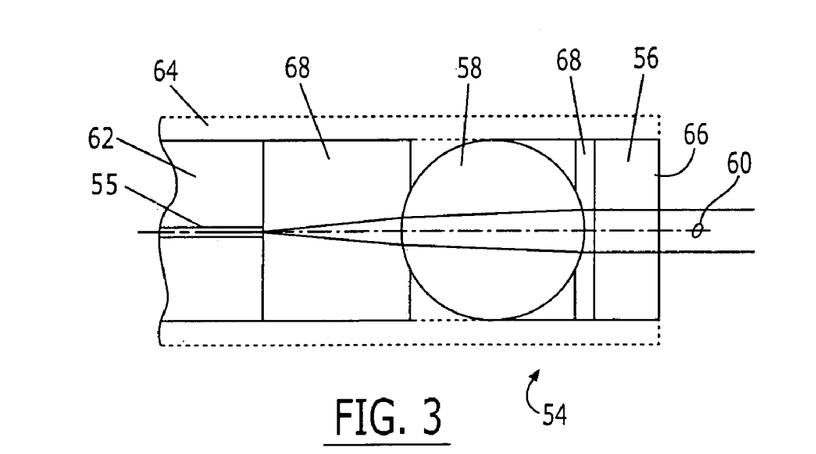
FIG. 3 is a side view of an optical collimation assembly according to another aspect of the present invention.

According to this aspect of the present invention, the optical collimation assembly 54 also includes the interface optical element 56. The interface optical element is disposed proximate the collimating lens 58. In the embodiment in which the optical collimation assembly includes a sleeve 64, the interface optical element is also generally disposed within the sleeve on the opposite side of the collimating lens from the optical fiber 55. As shown in FIG. 3, for example, the interface optical element of this embodiment may be a plane-parallel plate that serves as a cylindrical window that is disposed within one end of the sleeve. The interface optical element and the sleeve are preferably sized such that the interface optical element is snugly received within the sleeve and is accordingly aligned with the optical fiber and the collimating lens. The interface optical element may be adhered to the inner surface of the sleeve.

The interface optical element 56 includes the optically-flat surface 66 as described above. The optically-flat surface of the interface optical element of this embodiment is oriented orthogonally to the collimation optical axis 60. Thus, optical signals are transmitted between the interface optical element and the internal cavity of the housing and, more commonly, the fluid disposed within the internal cavity 18 of the housing 16 in a direction that is normal to the optically-flat surface of the interface optical element. As such, the optical signals are not refracted at the interface of the interface optical element and the fluid such that variations in the optical properties of the fluid, such as the index of refraction of the fluid, do not disadvantageously alter the propagation of the optical signals.

The optical collimation assembly 54 of this embodiment may also include one or more index matching elements 68. The index matching elements are also typically disposed within the sleeve 64 proximate the collimating lens 58. As shown in the embodiment of FIG. 3, for example, one index matching element may be disposed within the sleeve between an end portion of the optical fiber 56 and the collimating lens, while another index matching element may be disposed within the sleeve between the collimating lens and the interface optical element. The index matching elements prevent the fluid disposed within the internal cavity 18 from residing in the optical path within the optical collimation assembly, such that variations in optical properties, including index of refraction, of the fluid do not adversely affect the effective focal length of the collimating lens 58. The index matching material may also be selected with an appropriate index of refraction so as to reduce undesirable back reflections within the optical collimation assembly. The index matching element disposed between the end portion of the optical fiber and the collimating lens advantageously has an index of refraction that is between the respective indices of refraction of the optical fiber and the collimating lens, such as about 1.48 in one embodiment. Similarly, the index matching element disposed between the collimating lens and the interface optical element may have an index of refraction between the respective indices of refraction of the collimating lens and the interface optical element, such as about 1.5 in one embodiment. The index matching material may be formed of various materials, but is typically a cured polymer, such as a silicone polymer, having stable optical properties that change little, if at all, in response to variations in the temperature and/or pressure. Additionally, the index matching elements disposed on opposite sides of the collimating lens may have the same or different lengths with the length of the index matching elements being selected based upon the location or distance at which the optical signals are to be focused by the collimating lens as will be apparent to those skilled in the art. Although not necessary for the practice of the present invention, the end face of the optical fiber may be polished so as to have a convex shape in order to further insure that physical contact is established between the optical fiber and the index matching element so as to avoid deleterious back reflections.

In order to transmit optical signals, the optical signals emitted by the optical fiber 56 are collimated by the collimating lens 58 and then passed through the interface optical element 56 at an orientation that is normal to the optically-flat surface 66. As such, variations in the index of refraction of the fluid to which the interface optical element is exposed will not alter the propagation of the optical signals since the optical signals are not refracted at the optically-flat surface. Conversely, optical signals received by the optical collimation assembly 54 arrive with an orientation normal to the optically-flat surface of the interface optical element. These optical signals are focused by the collimating lens to the optical fiber. Since the fluid no longer contacts the collimating lens or other components of the optical collimation assembly, optical signals can be reliably transmitted to and from the optical fiber even as the optical properties of the fluid disposed within the housing of the fiber optic rotary joint vary.

Figure 4A:
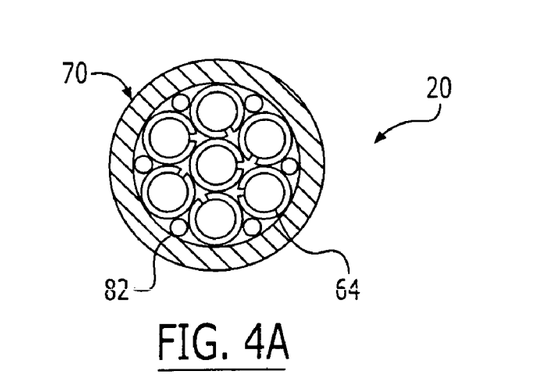
FIGS. 4a and 4b are cross-sectional views of a seven fiber optical collimation array and a twelve fiber optical collimation array, respectively, including a plurality of alignment pins.
Figure 4B:
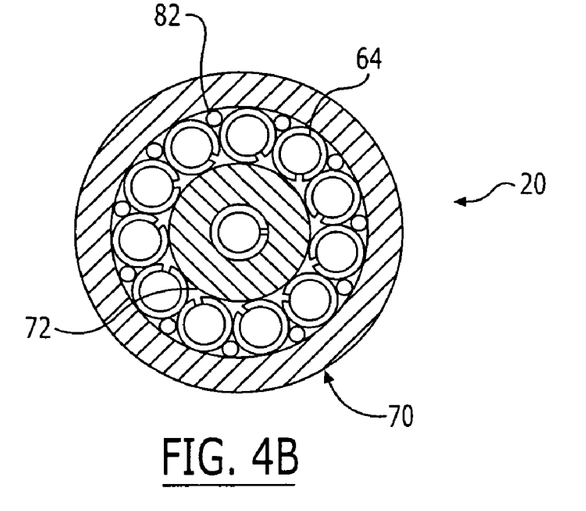

The first and second optical collimation arrays 20 may each be formed of a plurality of optical collimation assemblies 54 as described above and as depicted in FIG. 3. In this regard, a plurality of optical collimation assemblies may be disposed within an outer sleeve 70 that, in turn, is mounted to the housing 16, such as by means of a rotational engagement as shown in FIG. 1. As shown in FIGS. 4a and 4b, by way of example, the plurality of optical collimation assemblies can be disposed in various configurations to comprise a respective optical collimation array. As shown in FIG. 4a, for example, a plurality of optical collimation assemblies, such as seven optical collimation assemblies in the illustrated embodiment, may be relatively tightly packed within the outer sleeve. In order to construct optical collimation arrays having more optical fibers, optical collimation arrays having larger outer sleeves with different internal configurations may be utilized. As shown in FIG. 4b, for example, an inner sleeve 72 may be disposed about a central optical collimation assembly with eleven optical collimation assemblies disposed peripherally about the inner sleeve which are, in turn, surrounded by the outer sleeve. While two configurations of an optical collimation array are provided by FIGS. 4a and 4b, the optical collimation arrays of the fiber optic rotary joint 10 of the present invention may have a number of other configurations, if so desired.

As shown in FIG. 1, one or both optical collimation arrays 20 may be rotatably mounted to the housing 16. In this regard, cylindrical bearings 74 may extend about respective portions of the outer sleeve 70 so as to facilitate rotation of the outer sleeve relative to the housing. In this regard, the housing may define a passage that opens into the internal cavity 18 in which the respective optical collimation array is disposed. In order to retain the optical collimation array within the respective passage, a washer, ring or the like 76 may be disposed within a circular groove defined by the housing proximate the end of the passage that opens into the internal cavity. Additionally, a threaded nut or the like 78 may threadably engage that portion of the housing proximate the exterior surface such that the optical collimation array is retained between the washer and the nut in the illustrated embodiment. However, the optical collimation array may be rotatably mounted to the housing in other manners, if so desired.

To facilitate rotation of the optical collimation array, the outer sleeve 70 may include a medial flange 80 that extends radially outwardly therefrom. This medial flange may engage a planetary gear train or the like (not shown) in order to facilitate rotation of the housing 16 with respect to the optical collimation array. As such, the housing may be rotated, such as at a rate that is 50% of the rate at which the optical collimation array is rotated. As such, optical signals can continue to be communicated between the same respective pairs of optical fibers of the first and second optical collimation arrays while at least one of the optical collimation arrays rotates about its longitudinal axis. Further details regarding the planetary gear train and the manner in which the optical collimation array is rotated relative to the housing are provided by U.S. Pat. No. 6,301,405.

According to one embodiment, the fiber optic rotary joint 10 therefore includes interface optical elements proximate both opposed end surfaces 42, 42 of the reversion prism 22 and proximate each collimating lens 58 of the first and second optical collimation arrays 20. As such, the optical signals that enter and exit the fluid that fills the internal cavity 18 of the housing 16 pass through the optically-flat surface of a respective interface optical element in a direction normal to the optically-flat surface such that the optical signals are not refracted. As such, variations in the optical properties of the fluid, such as variations in the index of refraction of the fluid, do not affect the propagation of the optical signals. Accordingly, the temperature and/or pressure to which the fiber optic rotary joint is exposed may vary without adversely affecting the alignment of the optical fibers of the first and second bundles 12,14 of optical fibers.

Figure 5:
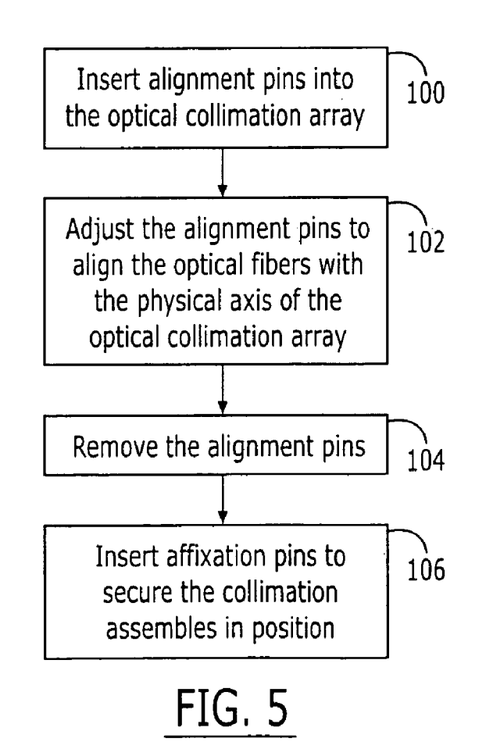
FIG. 5 is a flow chart illustrating a method of aligning an optical collimation array, such as those depicted in FIGS. 4a and 4b, according to another aspect of the present invention.

In order to further insure that the optical signals are appropriately transmitted between the optical fibers of the first and second bundles 12,14 of optical fibers, a method is also provided for aligning the optical fibers relative to the outer sleeve 70. In this regard, an optical collimation array 20 such as those depicted in FIGS. 4a and 4b is assembled which includes a plurality of collimation assemblies 54, each having a sleeve 64, a collimating lens 58 disposed within the sleeve and an optical fiber 56 having an end portion disposed within the sleeve, such as within a ferrule 62 that, in turn, is disposed within the sleeve. Prior to affixing the collimation assemblies in position, at least one elongate alignment pin 82 is inserted into the optical collimation array. See step 100 of FIG. 5. As described below, a plurality of alignment pins are typically inserted into the optical collimation array in order to appropriately align the collimation assemblies and, in turn, the optical fibers of the respective collimation assemblies. The alignment pins are inserted so as to extend lengthwise along respective collimation assemblies, such as along the sleeves of respective collimation assemblies. As shown in FIGS. 4a and 4b in which the optical collimation array further includes an outer sleeve 70 surrounding the plurality of collimation assemblies, the alignment pins are typically inserted between the outer sleeve and the collimation assemblies that are disposed proximate the outer sleeve. While various types of pins may be utilized as an alignment pin, a standard inspection plug gauge pin may be utilized. Preferably, the alignment pin fits relatively snugly between the outer sleeve and the collimation assemblies so as to make contact with the collimation assemblies, but are not so large as to wedge the collimation assemblies in place.

The alignment pins 82 are then adjusted so as to alter the angle between the alignment pins and the physical axis of the optical collimation array 20. See step 102 of FIG. 5. In this regard, the physical axis of the optical collimation array is typically defined as the longitudinal axis defined by the outer sleeve 70. In particular, the alignment pins are preferably adjusted until the alignment pins are parallel to the physical axis of the optical collimation array. By orienting the alignment pins to be parallel to the physical axis of the optical collimation array, the optical fibers of the collimation arrays are similarly oriented parallel to the physical axis of the optical collimation array. In this regard, the adjustment provided by the alignment pins eliminates any twists in the optical fibers and provides precise alignment of the collimation assemblies 54.

While the alignment pins 82 may be adjusted in various manners, the alignment pins advantageously not only extend through the optical collimation array 20, such as along a majority of the length of the sleeves 64 of the collimation assemblies 54, but also extend outwardly from the optical collimation array so as to be grasped by a technician or the like. While the alignment pins may be adjusted in various manners, it has been found to be useful to simultaneously adjust a pair of alignment pins that are spaced from one another, such as by being disposed upon opposite sides of the optical collimation array in order to appropriately align the collimation assemblies 54 and, in turn, the optical fibers 56.

Once the alignment pins 82 have been appropriately adjusted, such as by positioning the alignment pins to be parallel to the physical axis of the optical collimation array 20, the plurality of collimation assemblies 54 are affixed in position. In this regard, the alignment pins are generally withdrawn from the optical collimation array without altering the position of the collimation assemblies. See step 104 of FIG. 5. While the collimation assemblies may be thereafter affixed in position in various manners, the method of one advantageous embodiment subsequently inserts at least one and, more commonly, a plurality of affixation pins into the optical collimation array in place of the alignment pins. See step 106. In this regard, an affixation pin is generally inserted in each location from which an alignment pin was previously withdrawn. The affixation pins generally have a slightly larger cross-sectional diameter than the alignment pins and are sized to provide an interference fit within the optical collimation array, thereby wedging the collimation assemblies into a fixed position relative to each other and to the outer sleeve 70. The affixation pins are also generally somewhat shorter in length than the alignment pins such that the affixation pins extend through the optical collimation array, but do not protrude outwardly therebeyond.

As such, the method of this aspect of the present invention provides an efficient and reliable manner in which to align a plurality of optical fibers 56 of an optical collimation array 20. While this method need not be utilized in conjunction with optical collimation arrays that are employed by a fiber optic rotary joint 10, the precise alignment provided by the method of this aspect of the present invention would be useful for optical collimation arrays used with fiber optic rotary joints in order to insure that the respective optical fibers of the first and second bundles 12,14 of optical fibers are appropriately aligned. In this regard, this method allows a plurality of optical fibers of an optical collimation array to be aligned without requiring that the collimation assemblies 54 be epoxied within the outer sleeve 70 which could otherwise cause the optical fibers to become somewhat misaligned as the epoxy cures, thereby disadvantageously increasing the insertion loss.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical collimation assembly adapted to be at least partially submerged in a fluid having a variable index of refraction, comprising:
    an optical fiber;
    a collimating lens disposed in optical communication with said optical fiber, said collimating lens defining a collimation optical axis; and
    an interface optical element disposed proximate said collimating lens, said interface optical element including an optically-flat surface that is exposed to said fluid and that is orthogonal to the collimation optical axis such that beams of light transmitted between said interface optical element and said fluid will be substantially parallel to said collimation optical axis, said optically-flat surface being arranged such that variations in the index of refraction of said fluid will not adversely affect the propagation of optical signals between said fluid and said optical fiber.

2. An optical collimation assembly according to claim 1 wherein said interface optical element comprises a plane-parallel plate.

3. An optical collimation assembly according to claim 1 further comprising a sleeve in which said collimating lens and said interface optical element are disposed.

4. An optical collimation assembly according to claim 3 further comprising an index matching element disposed within the sleeve between an end portion of said optical fiber and said collimating lens.

5. An optical collimation assembly according to claim 3 further comprising an index matching element disposed within the sleeve between said collimating lens and said interface optical element.

6. A method of aligning an optical collimation array comprising a plurality of collimation assemblies, each collimation assembly comprising a sleeve, a collimating lens disposed within the sleeve and an optical fiber having an end portion disposed within the sleeve, said collimating lens having a collimation optical axis, wherein the method comprises:
    inserting at least one elongate alignment pin into the optical collimation array such that each alignment pin extends lengthwise along a respective collimation assembly;
    adjusting at least one alignment pin to alter an angle between the respective alignment pin and a physical axis of said sleeve; and
    affixing the plurality of collimation assemblies in position following adjustment of the at least one alignment pin by removing at least one alignment pin following adjustment of the at least one alignment pin, and inserting at least one physically-larger affixation pin into the optical collimation array in place of the at least one alignment pin, to cause the collimation optical axis to be substantially parallel to the physical axis of said sleeve.

7. A method according to claim 6 wherein adjusting the at least one alignment pin comprising adjusting the at least one alignment pin to be parallel with the physical axis of the optical collimation array.

8. A method according to claim 6 wherein inserting at least one elongate alignment pin comprises inserting a plurality of alignment pins, and wherein adjusting the at least one alignment pin comprises twisting a pair of alignment pins that are spaced apart from one another.

9. A method according to claim 6 wherein the optical collimation array further comprises an outer sleeve surrounding the plurality of collimation assemblies, and wherein inserting the at least one alignment pin comprises inserting the at least one alignment pin proximate the outer sleeve.

* * * * *